April 30, 1929.  J. DISTER  1,710,972
BAIL EAR AND METHOD OF APPLYING THE SAME
Filed Feb. 20, 1926
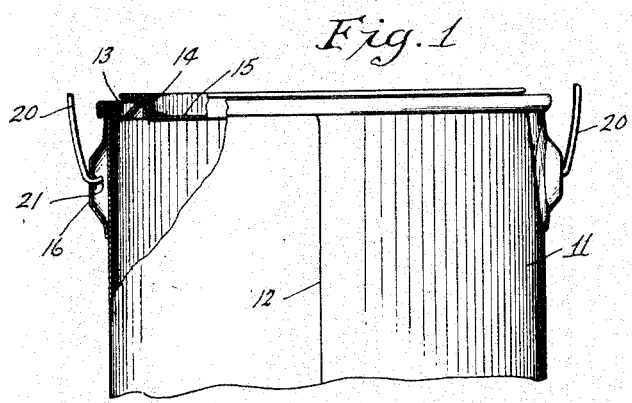
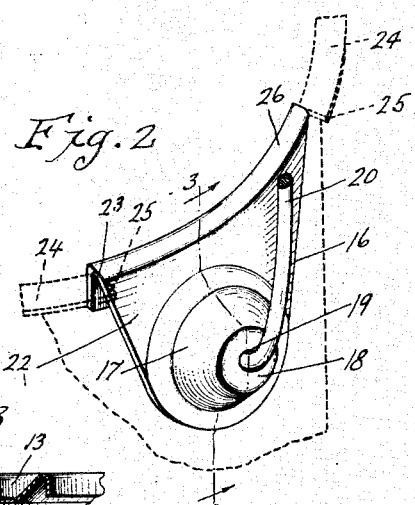
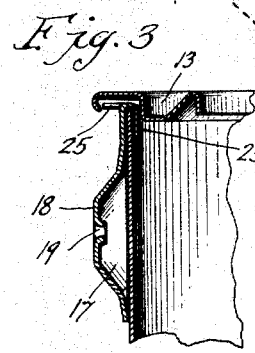
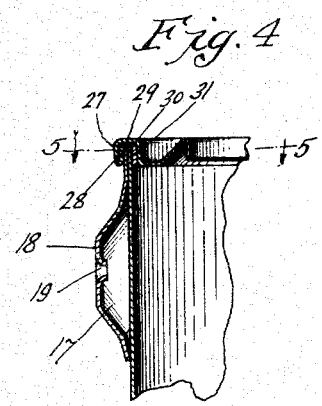
INVENTOR.
Joseph Dister
BY Munday Clarke & Carpenter
ATTORNEY Patented Apr. 30, 1929.

1,710,972

UNITED STATES PATENT OFFICE.

JOSEPH DISTER, OF HAMILTON, OHIO, ASSIGNOR TO AMERICAN CAN COMPANY, OF NEW YORK, N. Y., A CORPORATION OF NEW JERSEY.

BAIL EAR AND METHOD OF APPLYING THE SAME.

Application filed February 20, 1926. Serial No. 89,613.

This invention relates in general to that type of containers such as paint cans, pails and buckets, which may be carried about by means of a bail or wire handle, which is secured thereto.

Heretofore bail ears have been connected to can bodies by means of solder. Solder is very expensive and the soldering of such small articles as bail ears involves a great many operations and the employment of expensive manual labor, or the use of costly and complicated automatic machinery. When automatic machinery is used a large percentage of defectively soldered bail ears results with the natural consequence that additional machines or devices for testing the soldered bail ears are required if substantially perfect bail ear connections are to be delivered.

The use of rivets instead of solder to connect the bail ear to the can body is also a very expensive and laborious procedure and is attended by the further disadvantage that riveting bail ears onto can bodies requires the puncturing or piercing of the can body wall, which operation destroys the hermetic quality of the can which in most cases is absolutely necessary.

One of the objects of my invention resides in providing an improved new type of bail ear for securely holding a bail and also an improved method of attaching a bail ear to a can body in a novel and efficient manner.

A further object of the invention resides in the provision of a bail ear which may be secured to the can body without the use of solder or rivets or any means except the material of the ear itself, and which is of such shape and size that it will cling to the can body in a rigid manner and be just as strong or even stronger than a bail ear which is soldered and riveted.

Numerous other objects and advantages of the invention will be apparent as it is better understood from the following description, which, taken in connection with the accompanying drawings, discloses a preferred embodiment thereof.

Fig. 1 is a side elevation, partly broken away, of the upper part of a can body, having my novel bail ear attached thereto.

Fig. 2 is a detailed perspective view of a portion of a can and bail with my new type bail ear loosely attached thereto just prior to the final securing operation, the can part being shown in dotted lines.

Fig. 3 is a detailed sectional view taken on line 3—3 of Fig. 2 and showing the bail ear in position to be engaged and crimped in position by the can end flange.

Fig. 4 is a view similar to Fig. 3 with the bail ear in finished crimped position.

Fig. 5 is a detailed section through lines 5—5 of Fig. 4.

Referring now to Fig. 1 a can body 11, with the usual side seam 12, has double seamed thereto an annular end portion or member 13 with a friction seat wall 14, which friction seat wall is engaged by the ordinary friction plug 15 of the paint can type. It will be understood that this general construction of the can is not part of my invention and the general form of construction shown has been chosen merely as a preferred illustration. A bail ear 16 has a domed part 17 terminating into a flat part 18 with a bail receiving hole 19 in the center of said flat part. The usual wire bail 20 is bent at 21 into said bail receiving hole 19. An important part of my improved bail ear is the flaring skirt or fan shaped portion 22 which gets wider towards the end and just before the end is reached it is turned over into a hooked part 23. It is this bent over part which permits the bail ear to lie hooked over the top edge of the can body and which holds the bail ear securely in position, while the crimping operation is performed. The outwardly extending flange 24 of the can body is cut away between the points 25 (Fig. 2) so that the flat top part 26 of the bent over portion of the bail ear lies at an even level with the rest of the can body flange. When two corresponding bail ears have been hooked over the cut away part of the can body wall at two opposite points and the annular end friction ring has been placed over the positioned bail ears and over the outwardly extending body flange, as clearly illustrated in Fig. 3, all parts are in loosely assembled position ready for the double-seaming tool to do its part and bend or crimp them in the finished shape shown in Fig. 4.

Fig. 5 shows the six layers or thicknesses of sheet metal as they are in finished position and as viewed in cross section through lines 5—5 of Fig. 4. The outer layer or thickness of sheet metal 27 represents the outer downwardly extending part of the cover flange, the next layer 28 is the upwardly turned edge of the cover flange, the next thickness 29 is the material of the wide part of the bail ear just before it is turned into hook form, the next thickness of metal 30 is the can body wall, the next layer of metal 31 is the hooked end of the bail ear and the last and inner layer of metal represents the vertical channel wall of the annular friction ring. I make my bail ear skirt part 22 of wide, generous proportions and curve the same to correspond with the contour of the can body. This curving of the bail ear metal over as large an area as is reasonably practical not only stiffens and strengthens the bail ear sufficiently to withstand the pull of the weight of very heavy contents, but also makes the bail ear hug the can body very tightly over a maximum of area so that it cannot bend outward and provides a neat appearing and strong bail ear which is equal in appearance and service to soldered and riveted bail ears and has none of the disadvantages of the latter.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a can body flanged at its top end and adapted for double seaming and having a portion of its flange cut out, a bail ear having a hook resting in said cut out and depending within the can body, an end member having a double seaming flange and a shoulder fitting within the body and against said hook of the bail ear, the flanges of the body and end member being double seamed together and compressed against the outer side of the bail ear, whereby the latter is directly engaged and held securely by opposing parts of the end member on each side of the body wall.

2. The process of applying bail ears to cans comprising providing the peripheral lateral flange of the can with a cut-out, forming the bail ear with an upper overfold adapted to overlie the can edge in the cut-out and a depending skirt, applying an end part so that a wall thereof engages the inner face of the inturned flange of the skirt and double seaming the peripheral flange of the end part to the peripheral flange of the can body and compressing the double seam tightly against the outer side of the bail ear to hold the bail ear in firm position on said can body.

JOSEPH DISTER.